US012626013B2

(12) United States Patent
Ngo et al.

(10) Patent No.: US 12,626,013 B2
(45) Date of Patent: May 12, 2026

(54) PRIVACY PRESERVING FEDERATED QUERY ENGINE

(71) Applicant: LiveRamp, Inc., San Francisco, CA (US)

(72) Inventors: Chi Lang Ngo, London (GB); Maciej Makowski, Warsaw (PL); Piotr Gabryanczyk, London (GB); David Gilmore, Santa Cruz, CA (US); Isaac Hales, Holladay, UT (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 18/709,765

(22) PCT Filed: Nov. 15, 2022

(86) PCT No.: PCT/US2022/049973
§ 371 (c)(1),
(2) Date: May 13, 2024

(87) PCT Pub. No.: WO2023/091418
PCT Pub. Date: May 25, 2023

(65) Prior Publication Data
US 2025/0005194 A1     Jan. 2, 2025

Related U.S. Application Data

(60) Provisional application No. 63/279,867, filed on Nov. 16, 2021.

(51) Int. Cl.
G06F 16/2453      (2019.01)
G06F 16/2452      (2019.01)
(Continued)

(52) U.S. Cl.
CPC .... G06F 21/6245 (2013.01); G06F 16/24526 (2019.01); G06F 16/24542 (2019.01); G06F 16/256 (2019.01)

(58) Field of Classification Search
CPC ........... G06F 21/6245; G06F 16/24526; G06F 16/24542; G06F 16/256; G06F 16/24534; G06F 16/283
See application file for complete search history.

(56) References Cited

U.S. PATENT DOCUMENTS 7,392,255 B1     6/2008   Sholtis et al.
7,461,052 B2    12/2008   Dettinger et al.
(Continued)

OTHER PUBLICATIONS

Feras M. Awaysheh, Mamoun Alazab, Maanak Gupta, Tomás F. Pena, José C. Cabaleiro, Next-generation big data federation access control: A reference model, Jul. 1, 2020.
(Continued)

*Primary Examiner* — Dangelino N Gortayo

(57) ABSTRACT

A federated query engine system and method for multiple datasets is enhanced with privacy preserving features. It may, for example, limit the movement of data from one or more of the datasets being accessed. It may use cryptographic long-term keys, enabling fuzzy table joins that do not require a comparison of the plaintext column values. The query plan may leverage the particular infrastructure of the storage system that houses each of the datasets. The query engine receives a standard SQL query, translates the query into a logical plan for performing the query across the multiple datasets, converts the logical plan into physical plans that are specific to the implementational architecture of the multiple datasets, and sends these physical plans to SQL workers located near the data warehouses housing each dataset.

18 Claims, 2 Drawing Sheets

(51) Int. Cl.
    *G06F 16/25*     (2019.01)
    *G06F 21/62*     (2013.01)

(56)         References Cited

U.S. PATENT DOCUMENTS

| | | | |
|---|---|---|---|
| 7,523,118 | B2 | 4/2009 | Frielander et al. |
| 7,752,215 | B2 | 7/2010 | Dettinger et al. |
| 8,549,026 | B2 | 10/2013 | Haudenschild et al. |
| 8,832,556 | B2 | 9/2014 | Steinberg |
| 9,665,620 | B2 | 5/2017 | Schechter et al. |
| 10,614,242 | B2 | 4/2020 | Rogers et al. |
| 10,936,738 | B1 | 3/2021 | Roberts et al. |
| 10,970,419 | B1 | 4/2021 | Blum et al. |
| 11,086,915 | B2 | 8/2021 | Chitnis et al. |
| 2005/0149496 | A1 | 7/2005 | Mukherjee et al. |
| 2017/0364694 | A1* | 12/2017 | Jacob ................ G06F 16/24542 |
| 2020/0074298 | A1* | 3/2020 | Jacob .................... G06N 5/022 |
| 2020/0301913 | A1 | 9/2020 | Lai |
| 2021/0012029 | A1 | 1/2021 | Gustafsson et al. |
| 2021/0064618 | A1 | 3/2021 | Liu et al. |
| 2021/0097067 | A1 | 4/2021 | Virtuoso et al. |
| 2022/0327127 | A1* | 10/2022 | Anand ................ G06F 16/2433 |
| 2023/0133840 | A1* | 5/2023 | Jiménez .............. H04W 12/086 |
| | | | 726/26 |
| 2023/0308458 | A1* | 9/2023 | Varsanyi ............... H04L 63/166 |

OTHER PUBLICATIONS

Rajkumar Buyya, Rajiv Ranjan, Rodrigo N. Calheiros, Intercloud: Utility-oriented federation of cloud computing environments for scaling of application services, May 21, 2010.

Extended European search report for related application No. 22896382.3 (issued Jul. 1, 2025).

Rogers, Jennie et al., "Privacy Changes Everything," DMAH 2019/ Poly 2019, LNCS 11721, pp. 96-111 XP047525350 (Oct. 23, 2019).

Endris, Kemele M. et al., "Chapter 5 Federated Query Processing." Knwoledge Graphs and Big Data Processing, LNCS 12072, pp. 73-86 XP047557047 (Jul. 16, 2020).

* cited by examiner

PRIVACY PRESERVING FEDERATED QUERY ENGINE

CROSS-REFERENCE TO RELATED APPLICATIONS

This application claims the benefit of U.S. provisional patent application No. 63/279,867, filed on Nov. 16, 2021. Such application is incorporated herein by reference in its entirety.

BACKGROUND

Modern enterprises often have large datasets stored in data warehouses hosted on different infrastructure and/or cloud storage environments. Enterprises nevertheless often wish to collaborate with each other on these datasets.

One recent approach to solving this problem is federated query engines. In a typical federal query engine, data is to be extracted from multiple sources remote from each other, such as databases and data warehouses, whether found on local infrastructure or in cloud storage. Standard query language (SQL) scripts are written that fetch data from across these sources and join tables from different datasets. Examples of commercial products include Amazon Redshift and Athena used in the AWS cloud environment, as well as Google BigQuery used in the Google Cloud environment. These systems avoid the long, tedious extract, transform, load (ETL) processes required to bring data together in a shared format in order to run queries, because the data remains in place across the different data sources. A single SQL-like query can be made that pulls data across these disparate sources. Because the federated query systems perform the necessary translation, the user need not know the specific query or data language for each dataset; automated conversion allows anyone to perform queries across all of the data sources. Trino, Spark, and Dremio are examples of platforms providing federated query support.

A limitation of federal query systems is that they do not include a means of controlling privacy independently across the multiple datasets being accessed. Individual datasets may, however, have different privacy requirements. These privacy requirements may be dictated by the organization that keeps the data, by the nature of the data itself, or by the laws and regulations of the jurisdiction where the data was collected and/or stored. Thus a system for providing privacy protections as a part of a federated query system is desired.

References mentioned in this background section are not admitted to be prior art with respect to the present invention.

SUMMARY

The present invention is directed to a federated query engine system and method with privacy preserving features. In certain embodiments, the federated query engine may limit the movement of data from one or more of the datasets being accessed. For example, the owner of a particular dataset may specify that a certain column of data within the dataset may never leave its own network. Also in certain embodiments, privacy-enhancing technologies may be inserted into the query plan developed by the federated query engine to enable privacy-preserving table joins. For example, this may be performed by using cryptographic long-term keys, which is a bloom-filter-based cryptographic approach, thereby enabling fuzzy table joins that do not require a comparison of the plaintext column values. Also in certain embodiments, the query plan developed by the federated query engine may leverage the particular infrastructure of the storage system that houses each of the datasets. For example, if there are multiple datasets stored in Snowflake accounts, the plan may take advantage of the native Snowflake capability for enabling secure data sharing, while recognizing that this will not be part of the plan for joins between Snowflake and non-Snowflake dataset environments.

By having awareness of both data location (for federation) and privacy constraints of each of the underlying datasets, the federated query engine system according to embodiments of the invention can rewrite/generate an optimal privacy-compliant execution plan. These and other features, objects and advantages of the present invention will become better understood from a consideration of the following detailed description of the preferred embodiments and appended claims in conjunction with the drawings as described following.

DRAWINGS

DETAILED DESCRIPTION

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 2:
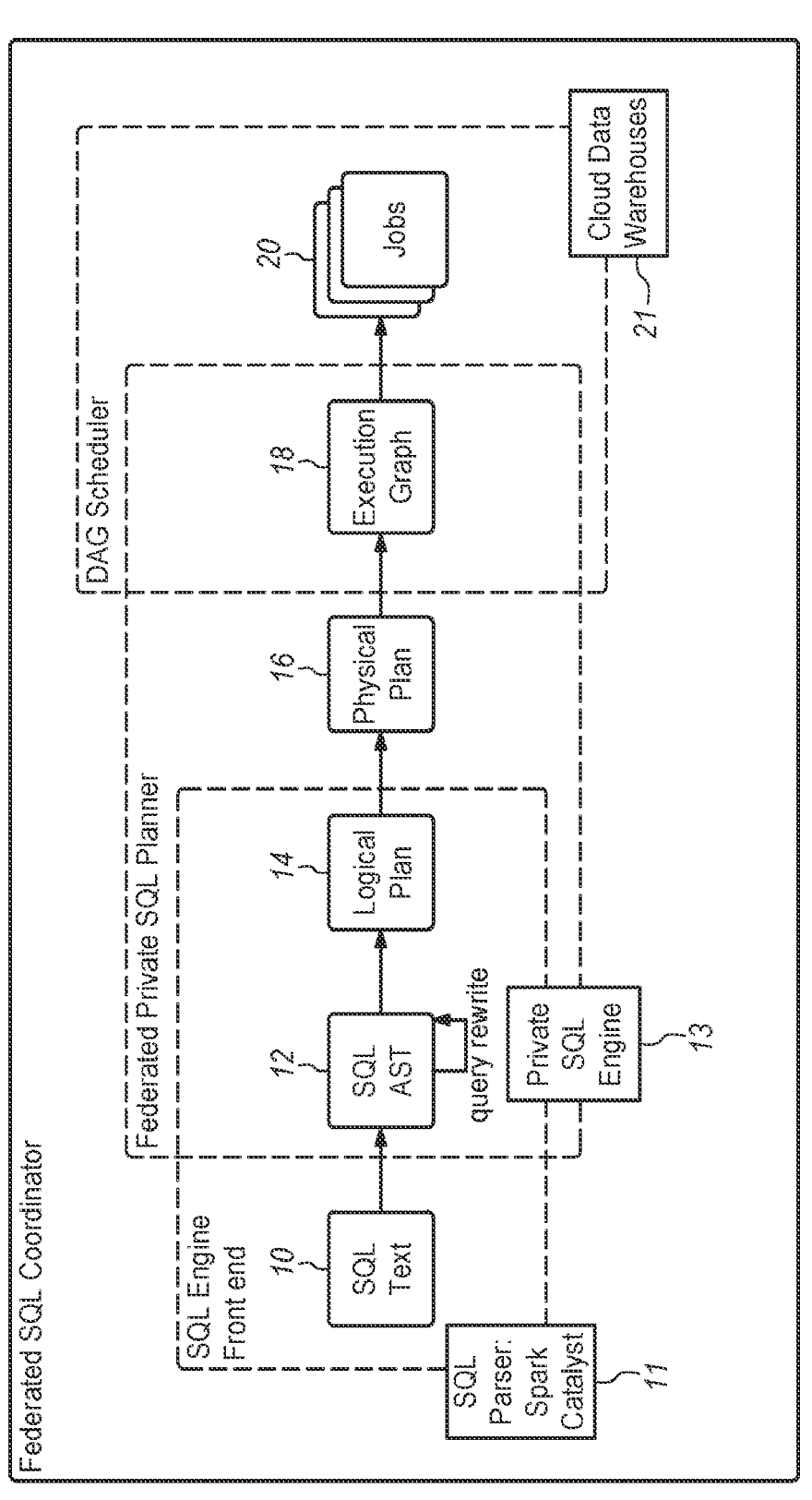
FIG. 2 is a process flow diagram for a federated SQL coordinator according to an embodiment of the present invention.

With reference to FIG. 2, an overview of the flow for use of an embodiment of the present invention as a privacy-preserving federated SQL engine may work as follows. At SQL text step 10, the engine takes as its inputs (a) a query statement, which may be written in SQL; (b) a set of privacy policies associated with the datasets being queried; and (c) a schema for each dataset/table along with the dataset locations (i.e., the association with the underlying data warehouse). This step may be performed using an SQL parser/optimizer 11 such as Spark Catalyst. Within the private SQL engine 13 itself, the next step is that the engine parses the SQL statement into a structured form at SQL AST step 12. Abstract syntax trees (AST) are structured tree data structures provide a machine-readable format for concrete syntax code. Specifically for SQL, they may take the form of a tree composed of Join, Filter, Projection, etc. nodes. Based on the input privacy policies and table locations, the engine 13 then performs a structural transformation (i.e., rewrite) of the query's AST to satisfy the privacy constraints placed upon the system. This creates the "logical" plan 14 for queries to each of the separate datasets. From this logical plan 14, engine 13 then generates an optimized query execution, physical plan 16 that considers both the privacy constraints and the dataset/table locations. The top-level physical plan 16 can be composed of multiple separate physical plans 16, one for each of the underlying datasets (for which the tables are part of the input query).

It may be seen that SQL query engine 13 uses the input query to define a logical plan 14, defining what has to be done, but not the algorithm-level details of how it will be done. Using that logical plan 14, one or more physical plans

16 are created that define the specific algorithms that will be used to run the query. The optimizer 11 then tries to choose the best physical plan 16, and finally, the query is executed according to this plan.

Once the physical plans 16 are created, they are dispatched to each of the data warehouse's SQL workers at execution graph 18. In this process, the individual physical plans are transformed into a specific data warehouse 21 SQL (or non-SQL) dialect appropriate to each dataset. The SQL worker then runs the translated query against the underlying dataset, fetches the results, and send the results back to a coordinator at jobs step 20. The coordinator performs the final aggregation from multiple results, potentially applies additional privacy constraints on the aggregated results, and returns the results back from the SQL engine 13.

Figure 1:
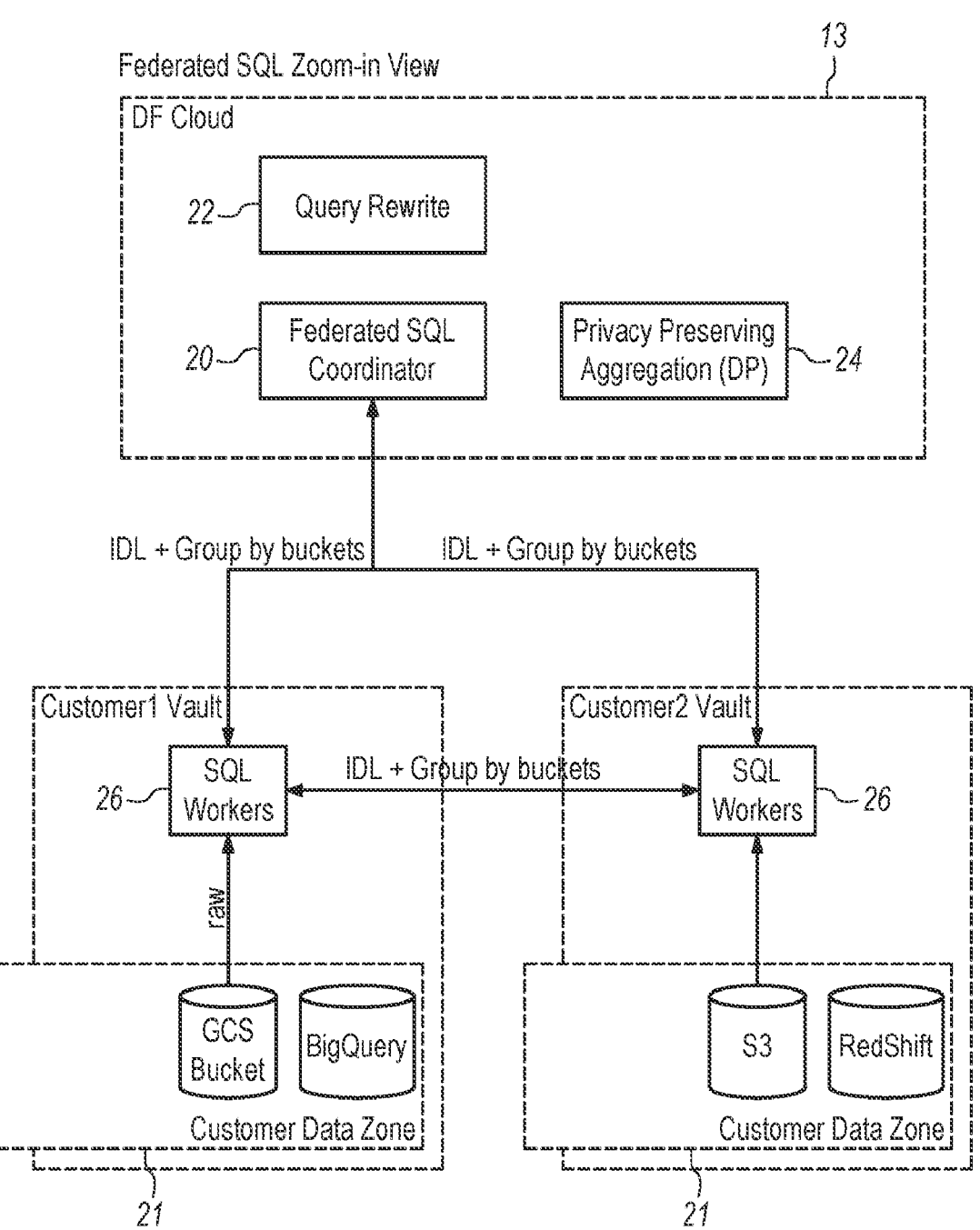
FIG. 1 is an architectural diagram of a system according to an embodiment of the present invention.

With reference now to FIG. 1, the structure of a system according to an embodiment of the invention may be described. SQL engine 13 includes an SQL coordinator 20, a query rewrite SQL planner 22, and an SQL aggregator 24. The SQL planner 22 utilizes an SQL parser and SQL query optimizer library, but performs a custom rewrite/transformation and optimization to generate multiple physical plans 16 for each of the datasets in data warehouses 21. The SQL aggregator 24 performs on-the-fly aggregation and applies custom privacy restriction to the query results. The SQL aggregator uses standard local SQL databases or data warehouses. SQL workers 26 are positioned near each dataset. The SQL workers 26 perform a translation of query AST to data warehouses dialect and relies on existing data warehouses to execute the physical SQL (or non-SQL) query.

The SQL engine 13 relies on existing cloud data warehouses (BigQuery, Snowflake, AWS Athena, etc.) for the actual execution of each underlying query. The SQL engine 13 control plane may be deployed in a service provider's cloud (e.g., Google Cloud) while the SQL workers 26 may be deployed near the customer's data warehouse/cloud 21.

An example operation of the system may now be described. Suppose that a query is run against two datasets: one dataset represents customer relationship management (CRM) data from a sneaker manufacturer, while the other dataset represents transactions from a retailer who sells sneakers of the supplier's brand as well as other brands. The query seeks to know how many customers bought the supplier's brand of sneakers from the retailer and who are also members of the supplier's online VIP customer program. In this example, the retailer dataset is housed in a Snowflake cloud environment, while the retailer's dataset is in Google BigQuery. The SQL workers 26 at each of these locations will therefore translate the query into the local dialect for the SQL operation at each of these two datasets. The data needed may, in this example, include the STORE SALES fact table, and combine that with item and date information.

The privacy component of the system may be implemented in a number of ways. Suppose that the query is made by the supplier. The retailer may have granted the supplier access to transaction data, but does not wish to reveal private customer data in order to protect privacy. The retailer therefore does not wish to allow the supplier to simply download their full dataset. So in this example the retailer sets a query threshold value of 100, which means that all queries must be aggregate queries, and groups with fewer than 100 customers will not be returned.

The suppression of rows below the threshold is achieved by the query rewrite module 22 of the SQL planner modifying the logical query plan to include the counts of distinct customers who contributed to the values in each aggregation group. As a result, the counts are calculated efficiently in the source data warehouse 21. These counts are then included in each aggregated row of results, and the rows that do not meet the set threshold (100 in this example) are excluded by the aggregator 24 from the results returned to the user. In the presence of federation, this approach allows for combination of data from multiple datasets, each with an independently set query threshold. The counts of customers are calculated independently for each constituent dataset and then all policies are enforced by the aggregator after the data is combined.

In order to join data from the suppliers' own dataset with the retailer dataset, some means of matching customer data is required. In one example, a customer identifier customer_id may be used. In some cases retailers and their suppliers could have a common identifier for customers, like email. In other cases they may use a third-party identity resolution product to append identifiers, such as LiveRamp's RampID product.

In addition to insights and measurement, another core supplier use case is to use this sort of data to create new advertising campaigns. Suppose that the supplier wishes to run a campaign for VIP club members who bought shoes from another brand in a particular month. Due to the query threshold, the supplier cannot see who the specific customers are within this group. But by using a third-party system to match against, direct distribution of this sort of custom customer set may be enabled.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system's memory capabilities may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A federated query method, comprising the steps of:
receiving a query statement, a schema for each of a plurality of datasets, and at least one privacy policy at a query engine, wherein each of the plurality of datasets comprises a plurality of rows and a plurality of columns;
parsing the query statement into a structured form;
based on the privacy policy, performing a structural transformation of the structured form of the query statement to comply with a set of privacy requirements in the privacy policy to produce a logical query plan, wherein the privacy policy comprises privacy limitations that are different between different datasets in the plurality of datasets, and wherein the structural transformation comprises applying long-term keys utilizing bloom-filter based cryptography that enables fuzzy matching in order to enable privacy-preserving table joins without requiring comparison of plaintext column values, and wherein the structural transformation comprises modifying the logical query plan to calculate counts of distinct rows contributing to aggregation groups, and the rows not meeting privacy thresholds are excluded;
based on the schema for each of the plurality of datasets and the logical query plan, generating at least one physical query plan for a query at each of the plurality of datasets; and
at each of a plurality of worker nodes, each of which corresponds to one of a plurality of data warehouses each housing one of the plurality of datasets, transforming the physical query plan into a query dialect appropriate to the dataset at the data warehouse that each of the plurality of worker nodes corresponds to in order to produce a translated query.

2. The federated query method of claim 1, wherein the step of parsing the query statement into a structured form comprises the step of parsing the query statement into a tree structure.

3. The federated query method of claim 2, wherein the step of parsing the query statement into a tree structure comprises the step of parsing the query statement into an abstract syntax tree.

4. The federated query method of claim 1, further comprising the step of receiving a location for each of the plurality of datasets.

5. The federated query method of claim 1, wherein the at least one physical plan comprises a plurality of physical plans.

6. The federated query method of claim 5, wherein each of the plurality of physical plans is applied to one of the plurality of datasets.

7. The federated query method of claim 5, further comprising the step of choosing a best physical plan from the plurality of physical plans.

8. The federated query method of claim 1, further comprising the step of running each of the translated queries against one of the plurality of datasets.

9. The federated query method of claim 8, further comprising the step of fetching the results of running each of the translated queries against each of the plurality of datasets back to the query engine.

10. The federated query method of claim 9, wherein the query engine comprises a coordinator, and further comprising the step of fetching the results of running each of the translated queries against each of the plurality of datasets back to the coordinator.

11. The federated query method of claim 10, further comprising the step of aggregating the results of running each of the translated queries against each of the plurality of datasets at the coordinator.

12. The federated query method of claim 11, further comprising the step applying a set of additional privacy constraints to the aggregated results.

13. The federated query method of claim 1, wherein the privacy policy comprises a query threshold value.

14. The federated query method of claim 1, wherein the privacy policy comprises a restriction on data movement of a portion of the data in at least one of the plurality of datasets.

15. The federated query method of claim 14, wherein the portion of the data in at least one of the plurality of datasets is a column in at least one of the plurality of datasets.

16. The federated query method of claim 1, wherein the privacy policy comprises application of data warehouse native privacy-enhancing features between joins of at least two of the plurality of datasets.

17. The federated query method of claim 1, wherein the step of performing a structural transformation of the structured form of the query statement to comply with a set of privacy requirements in the privacy policy to produce a logical query plan comprises the step of suppressing rows in the plurality of datasets below a threshold value.

18. The federated query method of claim 17, wherein the threshold value varies between at least two of the datasets in the plurality of datasets.

\* \* \* \* \*